(12) United States Patent
Ryu et al.

(10) Patent No.: US 8,107,016 B2
(45) Date of Patent: Jan. 31, 2012

(54) DISPLAY APPARATUS AND DRIVING METHOD THEREOF

(75) Inventors: Yang-sun Ryu, Yongin-si (KR); Doo-hee Lee, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1289 days.

(21) Appl. No.: 11/751,063

(22) Filed: May 21, 2007

(65) Prior Publication Data
US 2008/0129884 A1  Jun. 5, 2008

(30) Foreign Application Priority Data

Nov. 30, 2006  (KR) .................. 10-2006-0119677

(51) Int. Cl.
*H04N 5/50* (2006.01)
(52) U.S. Cl. ...................... 348/731; 348/725
(58) Field of Classification Search .............. 348/731, 348/725, 732; 725/140, 136, 139
See application file for complete search history.

(56) References Cited

U.S. PATENT DOCUMENTS

| | | | |
|---|---|---|---|
| 6,177,931 B1 * | 1/2001 | Alexander et al. .............. 725/52 |
| 2003/0093815 A1 * | 5/2003 | Morrison ...................... 725/140 |

FOREIGN PATENT DOCUMENTS

| | | |
|---|---|---|
| CN | 1343419 A | 4/2002 |
| EP | 0725539 A2 | 8/1996 |
| KR | 1997-68550 A | 10/1997 |
| KR | 10-2006-0079409 A | 7/2006 |
| WO | 00/49802 A1 | 8/2000 |

OTHER PUBLICATIONS

Office Action dated Jun. 23, 2010 from the State Intellectual Property Office of P.R. China in counterpart Chinese Application 200710153475.4.

* cited by examiner

*Primary Examiner* — Michael Lee
(74) *Attorney, Agent, or Firm* — Sughrue Mion, PLLC

(57) ABSTRACT

A display apparatus and a driving method thereof are provided. The display apparatus includes a channel setting storage unit which stores mode selection information about a plurality of channel designation modes each of which designates a way of setting an initial channel to be automatically tuned to upon turning on the display apparatus. The display apparatus also includes a control unit which, upon turning on the display apparatus, determines one of the channel designation modes based on the stored mode selection information, and controls the display apparatus to automatically tune to a channel, designated to be the initial channel by the determined channel designation mode.

15 Claims, 4 Drawing Sheets

DISPLAY APPARATUS AND DRIVING METHOD THEREOF

CROSS-REFERENCE TO RELATED PATENT APPLICATION

This application claims priority from Korean Patent Application No. 10-2006-0119677, filed on Nov. 30, 2006 in the Korean Intellectual Property Office, the entire contents of which are hereby incorporated by reference.

BACKGROUND OF THE INVENTION

1. Field of the Invention

Apparatuses and methods consistent with the present invention relate to a display apparatus and a driving method thereof. More particularly, apparatuses and methods consistent with the present invention relate to a display apparatus through which a user can set an initial channel to be displayed upon turning on of the display apparatus according to a mode desired by a user, and a driving method thereof.

2. Description of the Related Art

A display apparatus such as a television (TV) or a video cassette recorder (VCR), upon turning on, automatically tunes to and displays a channel that was last viewed before the display apparatus was turned off. Accordingly, after turning on the display apparatus, a user changes a channel by inputting a key through an input device such as a remote controller, if he wants to view a different channel.

Meanwhile, display apparatuses for commercial use, such as TVs in hotels, hospitals, airports, terminals, or subways, are generally connected with a host system and have a preset default channel, such that, irrespective of any previously-displayed channel, the display apparatus automatically tunes to the preset channel by default, upon turning on.

The above concept of the commercial display apparatus has been incorporated into home use, according to which a service provider, such as a cable broadcast station, controls a home display apparatus to display an initial channel desired by the service provider when the display apparatus is turned on.

The Open Cable Application Platform (OCAP) is the specification for the U.S. cable broadcast, and provides a method for a service provider to set an initial channel of a display apparatus.

Manufacturers now provide display apparatuses along with a variety of services such as a channel manager which provides a JAVA application program Interface (API), enabling service providers to control display apparatuses in subscribers' homes.

The method of setting an initial channel of the display apparatus will be explained below.

Figure 1:
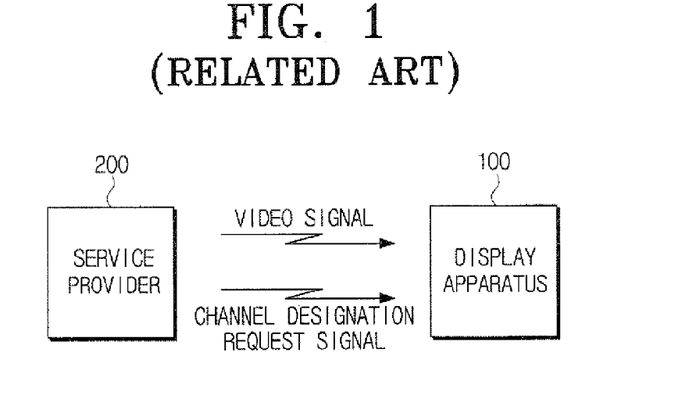
FIG. 1 is a schematic view of a related art system for setting an initial channel of a display apparatus according to the OCAP specification.
Figure 2:
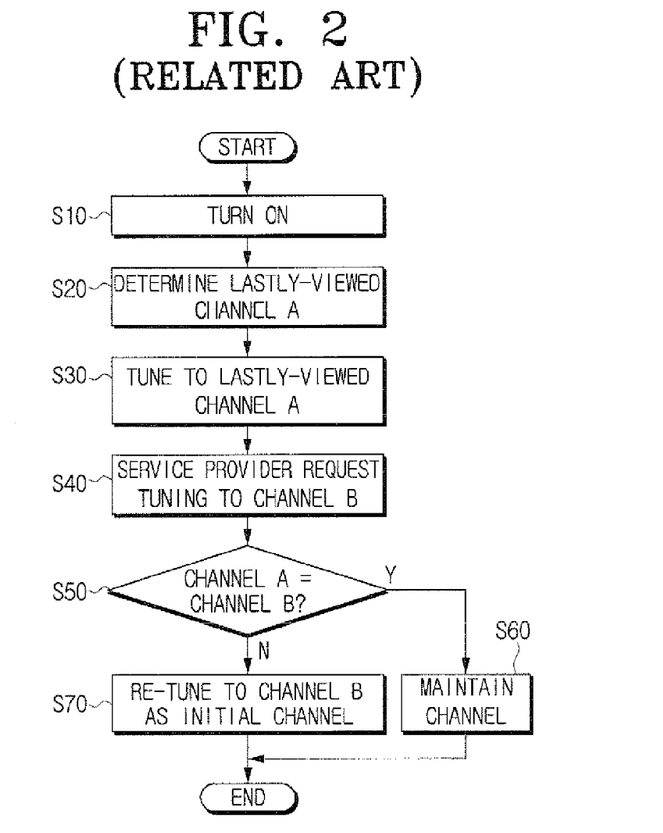
FIG. 2 is a flowchart illustrating a related art process of setting an initial channel of a display apparatus.

FIG. 1 schematically shows a system which sets an initial channel of a display apparatus according to the OCAP specification, and FIG. 2 is a flowchart illustrating the process of setting an initial channel of a display apparatus.

Referring to FIG. 1, a service provider 200 provides a display apparatus 100 with a video signal and a request signal for channel designation, and in response to the request signal (hereinafter, 'external request signal'), the display apparatus 100 sets an initial channel to tune to upon turning on, following the process illustrated in FIG. 2.

Referring to FIG. 2, the display apparatus 100 is turned on by the user (S10), and determines that the channel A was on when the display apparatus 100 was turned off (S20). A channel value of the channel A is automatically stored in the display apparatus 100 when the display apparatus 100 is turned off, such that the display apparatus 100 is able to determine that the channel A was the last channel that was viewed. Therefore, the display apparatus 100 tunes to the channel A, upon turning on (S30).

The service provider 200 may provide the external request signal according to the OCAP specification (S40), and accordingly, the API of the display apparatus 100 is called for and executed in response to the external request signal to cause the display apparatus 100 to tune to a channel B requested by the service provider 200.

Because the display apparatus 100 is set to initially tune to the last-viewed channel A, the display apparatus 100 is already tuned to the channel A. If the external request signal is received, the display apparatus 100 determines whether the last-viewed channel A matches the channel B (hereinafter, power-on channel) requested by the service provider 200 (S50).

If the last-viewed channel A matches the power-on channel B, the display apparatus 100 maintains the last-viewed channel A (S60).

If the last-viewed channel A does not match the power-on channel B, the display apparatus 100 conducts re-tuning such that the power-on channel B is set as an initial channel (S70).

In the system explained above, because the channel value of the last-viewed channel A is automatically stored in the non-volatile memory of the display apparatus 100, the last-viewed channel A is first tuned to as the initial channel upon turning on based on the stored channel value, and then the power-on channel B is re-tuned as the initial channel according to the control of the service provider 200.

Therefore, a transition period is required, during which the last-viewed channel A is displayed and then the power-on channel B is displayed.

Additionally, because the last-viewed channel A is first tuned to and then changed to the power-on channel B, it takes a considerable amount of time for the tuning, and subsequently increases the booting time of the display apparatus 100. As a result, a user may be inconvenienced, and tuning components such as a tuner can be overloaded due to double tuning.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a display apparatus in which an initial channel is set according to a tuning mode as designated by a user, and which prevents overload due to double-tuning and reduces time required for booting.

Another aspect of the present invention is to provide a method of driving the above display apparatus.

An aspect of the present invention provides a display apparatus, comprising: a channel setting storage unit which stores mode selection information about one or more channel designation modes each of which designates a way of setting an initial channel to be automatically tuned to upon turning on the display apparatus. The display apparatus also comprises a control unit which determines one of the channel designation modes based on the stored mode selection information upon turning on the display apparatus, and controls the display apparatus to automatically tune to a channel, designated to be the initial channel by the determined channel designation mode.

The display apparatus may further comprise a channel value storage unit which stores a channel value corresponding to the initial channel designated in the determined channel designation mode.

The display apparatus may further comprise a user interface unit which displays a setting menu for a selection of one of the channel designation modes. If a channel designation mode is selected through the setting menu, the control unit stores the mode selection information of the selected channel designation mode in the channel setting storage unit.

The channel designation modes may comprise a first channel designation mode according to which the initial channel is designated according to a first channel value contained in an external request signal, and a second channel designation mode according to which the initial channel is designated according to a pre-stored second channel value.

The second channel value may correspond to a last-viewed channel before the display apparatus is turned off.

The second channel value may be set and stored in advance by a user.

The control unit may comprise a tuning request processing unit which causes the display apparatus to automatically tune to a channel according to the first channel value as an initial channel, if the mode selection information indicates the first channel designation mode.

The tuning request processing unit may cause the display apparatus to automatically tune to a channel according to the first channel value as an initial channel, according to the Open Cable Application Platform (OCAP) specification, if the mode selection information indicates the first channel designation mode.

The control unit may cause the display apparatus to automatically tune to a channel according to the second channel value as an initial channel, if the mode selection information indicates the second channel designation mode.

The control unit may determine whether or not the first channel value is stored in the channel value storage unit, if the mode selection information indicates a first channel designation mode according to which the initial channel is designated according to a first channel value contained in an external request signal, and stores the first channel value is stored in the channel value storage unit if the first channel value is not stored.

The display apparatus may further comprise a tuner unit which tunes to a channel designated to be the initial channel according to the channel designation mode indicated by the mode selection information.

Another aspect of the present invention provides a method of driving a display apparatus, comprising: setting one of a plurality of channel designation modes which each designate a way of designating an initial channel to be automatically tuned to upon turning on the display apparatus; upon turning on the display apparatus, determining the set channel designation mode; and automatically tuning to a channel, which is designated to be the initial channel in the set channel designation mode.

The setting of the channel designation mode may comprise selecting one of the plurality of channel designation modes, storing a mode selection information corresponding to the selected channel designation mode, and setting the selected channel designation mode according to the stored mode selection information.

The setting of the channel designation mode may comprise setting one of a first channel designation mode according to which the initial channel is designated according to a first channel value contained in an external request signal, and a second channel designation mode according to which the initial channel is designated according to a pre-stored second channel value.

The second channel value may correspond to a last-viewed channel before the display apparatus is turned off.

The second channel value may be set and stored in advance by a user such that the corresponding channel is tuned to upon turning on the display apparatus.

The automatically tuning may comprise automatically tuning to a channel according to the second channel value as an initial channel, irrespective of whether or not the external request signal is input, if the determining indicates that the second channel designation mode is set.

The method may further comprise determining whether or not the first channel value is stored, if the determining indicates that the first channel designation mode is set.

The automatically tuning may comprise: tuning to a channel according to the second channel value, if the determining indicates that the first channel value is not stored, tuning to a channel according to the first channel value contained in the external request signal and storing the first channel value, and automatically tuning to the channel according to the first channel value as an initial channel, upon turning on.

The automatically tuning may comprise automatically tuning to the channel according to the first channel value as an initial channel, if the first channel value is determined to be stored.

The automatically tuning comprises tuning to the channel according to the first channel value as an initial channel, if the channel designation mode is the first channel designation mode, according to the Open Cable Application Platform specification.

BRIEF DESCRIPTION OF THE DRAWINGS

The above and other aspects of the present invention will become more apparent by the following detailed description of exemplary embodiments thereof with reference to the attached drawing figures, wherein.

DETAILED DESCRIPTION OF EXEMPLARY EMBODIMENTS OF THE PRESENT INVENTION

Hereinafter, exemplary embodiments of the present invention will be described in detail with reference to the accompanying drawing figures.

In the following description, the same drawing reference numerals are used for the same elements, even in different drawings. The matters defined in the description, such as a detailed construction and elements, are provided to assist in a comprehensive understanding of the invention. Thus, it is apparent that the present invention can be carried out without those defined matters. Also, well-known functions or constructions are not described in detail, since they would obscure the invention in unnecessary detail.

Figure 3:
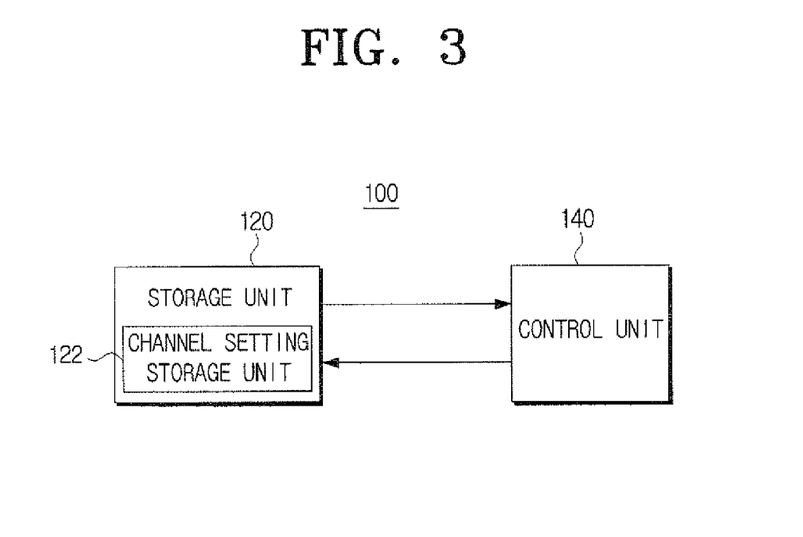
FIG. 3 is a block diagram of a display apparatus according to an exemplary embodiment of the present invention.
Figure 4:
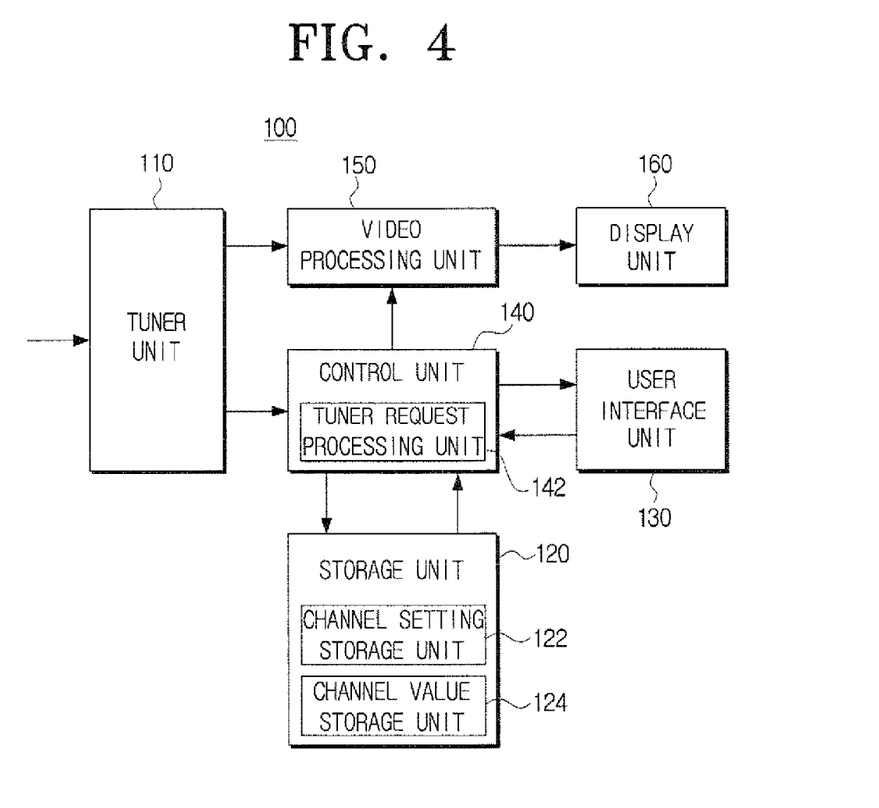
FIG. 4 is a block diagram of a display apparatus according to an exemplary embodiment of the present invention.

FIG. 3 is a block diagram of a display apparatus according to an exemplary embodiment of the present invention, and FIG. 4 is a block diagram of a display apparatus according to an exemplary embodiment of the present invention.

FIGS. 3 and 4 illustrate, in particular, the components of the display apparatus that are related to automatic tuning of initial channel. The other detailed parts are omitted from FIGS. 3 and 4 for the sake of convenient explanation. The display apparatus of FIGS. 3 and 4 is driven in the substantially same method as the display system of FIG. 1, so the components of the display apparatus will be given the same reference numerals as the display system of FIG. 1, and explained based on FIGS. 3 and 4 and with reference to FIG. 1.

Referring to FIGS. 1 and 3, the display apparatus 100 according to an exemplary embodiment of the present invention includes a storage unit 120 and a control unit 140.

The storage unit 120 includes a channel setting storage unit 122, and the channel setting storage unit 122 stores information about a selected channel designation mode (mode selection information), if a user of the display apparatus 100 selects the channel designation mode through a selecting operation.

For example, the channel designation mode may include a first channel designation mode in which the initial channel of the display apparatus 100 is set in accordance with a channel designation request signal (external request signal) being provided by a service provider, and a second channel designation mode in which a previously stored channel such as the last-viewed channel, which was stored before the display apparatus 100 was turned off, is set to be the initial channel of the display apparatus 100.

The channel setting storage unit 122, if one of the channel designation modes is selected by the user, stores the mode selection information corresponding to the selected channel designation mode in a data format recognizable by the control unit 140.

The channel setting storage unit 122 may be implemented as a nonvolatile memory such as electrically erasable programmable read-only memory (EEPROM).

The control unit 140 reads out the stored mode selection information from the channel setting storage unit 120, and determines whether the user selects the first channel designation mode or the second channel designation mode. The control unit 140 may determine the way of setting an initial channel according to each channel designation mode, and controls the display apparatus 100 such that it tunes to a corresponding channel upon turning on, according to the initial channel set in each channel designation mode.

The display apparatus 100 will be explained in greater detail below.

Referring to FIGS. 1 and 4, the display apparatus 100 according to an exemplary embodiment of the present invention includes a tuner unit 110, a storage unit 120, a user interface unit 130, a control unit 140, a video processing unit 150 and a display unit 160.

The tuner unit 110, under the control of the control unit 140, receives an external request signal and a video signal from a service provider 200, through a receiving apparatus such as an antenna.

The storage unit 120 stores therein a series of driving programs to enable the display apparatus 100 to display the video signal being provided from the service provider 200 on the display unit 160. The storage unit 120 may include a variety of memories such as random access memory (RAM), Read-only memory (ROM) and EEPROM.

According to an aspect of the present invention, the storage unit 120 may store information according to which setting menus are displayed through the user interface unit 130, and may also store a channel value of a last-viewed channel before the display apparatus 100 was turned off, or a channel value of a channel (a power-on channel) which is intended by the service provider 200 to be an initial channel of the display apparatus 100. The channel value of the power-on channel is contained in the external request signal being provided from the service provider 200.

The storage unit 120 may store the selected mode selection information, according to the selection by the user using the setting menus displayed on the user interface unit 130.

In case that a channel designation mode is selected by a user through the setting menu, the storage unit 120 may include a channel setting storage unit 122 which stores corresponding mode selection information, and a channel value storage unit 124 which stores the channel values.

The channel value storage unit 124 may store a channel value of the last-viewed channel before the display apparatus 100 was turned off. For example, if a user was viewing channel 10 before the display apparatus 100 was turned off, a binary value of 10 may be stored in the channel value storage unit 124.

The channel setting storage unit 122 may also store a channel value of the power-on channel. For example, if a service provider 200 wants to have channel 20 as the power-on channel, a binary value of 20 may be stored in the channel setting storage unit 122.

The storage unit 120 may store an API to be selectively called for according to the external request signal, if the display apparatus 100 is controlled according to the external request signal based on the OCAP specification.

The user interface unit 130 receives information such as environment setting conditions of the display apparatus 100, by the user of the display apparatus 100. Accordingly, the user interface unit 130 may include at least one function key. In one exemplary implementation, the user interface unit 130 may be configured such that switch elements arranged on the outer side of the display apparatus 100 operate as the function keys. In another exemplary implementation, the user interface unit 130 may be configured such that the function keys are displayed on the display unit 150 as an On-screen display (OSD), through which a user can select desired function keys with remote controlling, touching or manipulating of the switch elements.

According to an aspect of the present invention mentioned above, a setting menu may be displayed on the user interface unit 130, such that at least one channel designation mode is selected to designate the way of setting an automatic tuning to the initial channel, in response to the turning on of the display apparatus 100.

The control unit 140 controls the overall operation of the display apparatus 100. In particular, the control unit 140 according to an exemplary embodiment of the present invention reads out information about the setting menus from the storage unit 120 such that one of the channel designation modes is selected by a user, and displays the setting menus on the display unit 160 using the read information.

The control unit 140 sets the display apparatus 100 to the channel designation mode selected through the setting menus, such that the initial channel of the display apparatus 100 can be set according to the set channel designation mode.

For example, in the first channel designation mode, which sets the initial channel of the display apparatus 100 according to the external request signal, the control unit 140 stores in the channel setting storage unit 122 the first mode selection information corresponding to the first channel designation mode. Additionally, the control unit 140 controls the extraction of the first channel value, corresponding to the power-on channel, from the external request signal and its storage in the channel value storage unit 124. The control unit 140 also controls the tuning unit 110 to tune to the power-on channel, based on the first channel value.

Accordingly, the control unit 140 may include a tuning request processing unit 142 which calls for the API from the storage unit 120 according to the external request signal and causes the display apparatus 100 to be controlled according to the external request signal.

In the second channel designation mode which sets a pre-stored channel such as the last-viewed channel before the turning off as an initial channel, the control unit causes the second mode selection information corresponding to the second channel designation mode to be stored in the channel setting storage unit 122. The control unit 140 also causes the second channel value about the last-viewed channel to be stored in the channel value storage unit 124. Additionally, the control unit 140 controls the tuning unit 110 to tune to the last-viewed channel before the turning off, upon turning on of the display apparatus 100, according to the second channel value.

In the example explained above, the second channel value is stored when it is in the second channel designation mode. In an alternative example, the second channel value may be stored in the channel value storage unit 124 whenever the display apparatus 100 is turned off.

In the above example, the second channel value is defined as the channel value about the last-viewed channel before the turning off, but one will understand that the second channel value may include a variety of different values. For example, the second channel value may be correspond to a channel value intended by a user to tune to, upon turning on of the display apparatus. The channel value intended by the user may be predetermined and stored in the storage unit 120.

The video processing unit 150 decodes the video signal of the tuned channel input through the tuner unit 110, and processes the signal to a suitable format for the display unit 160.

The display unit 160 displays the video processed at the video processing unit 150. The display unit 160 may include the user interface unit 130 which displays the setting menus for the selection of channel designation mode. The display unit 160 displays the channel processed at the video processing unit 150 according to the selected channel designation mode. For example, the display unit 160 may selectively display the last-viewed channel or the power-on channel, according to the control of the control unit 140.

The operation of the display apparatus 100 will be explained in greater detail below.

Figure 5:
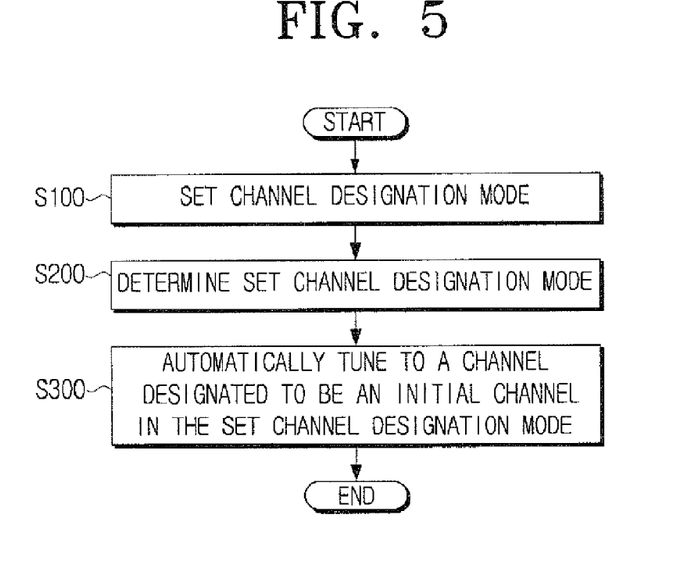
FIGS. 5 to 7 are flowcharts illustrating a driving method of a display apparatus according to exemplary embodiments of the present invention.
Figure 6:
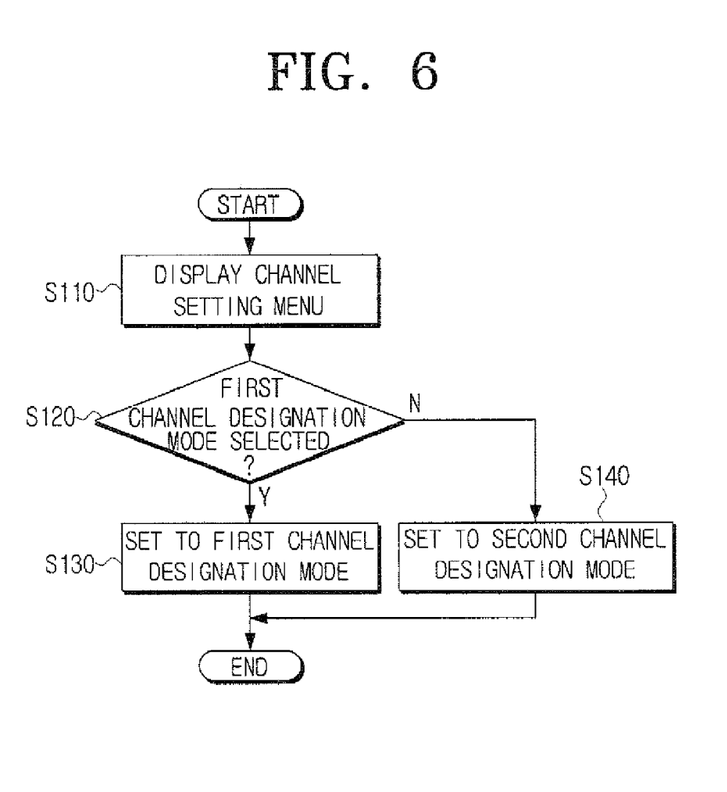
Figure 7:
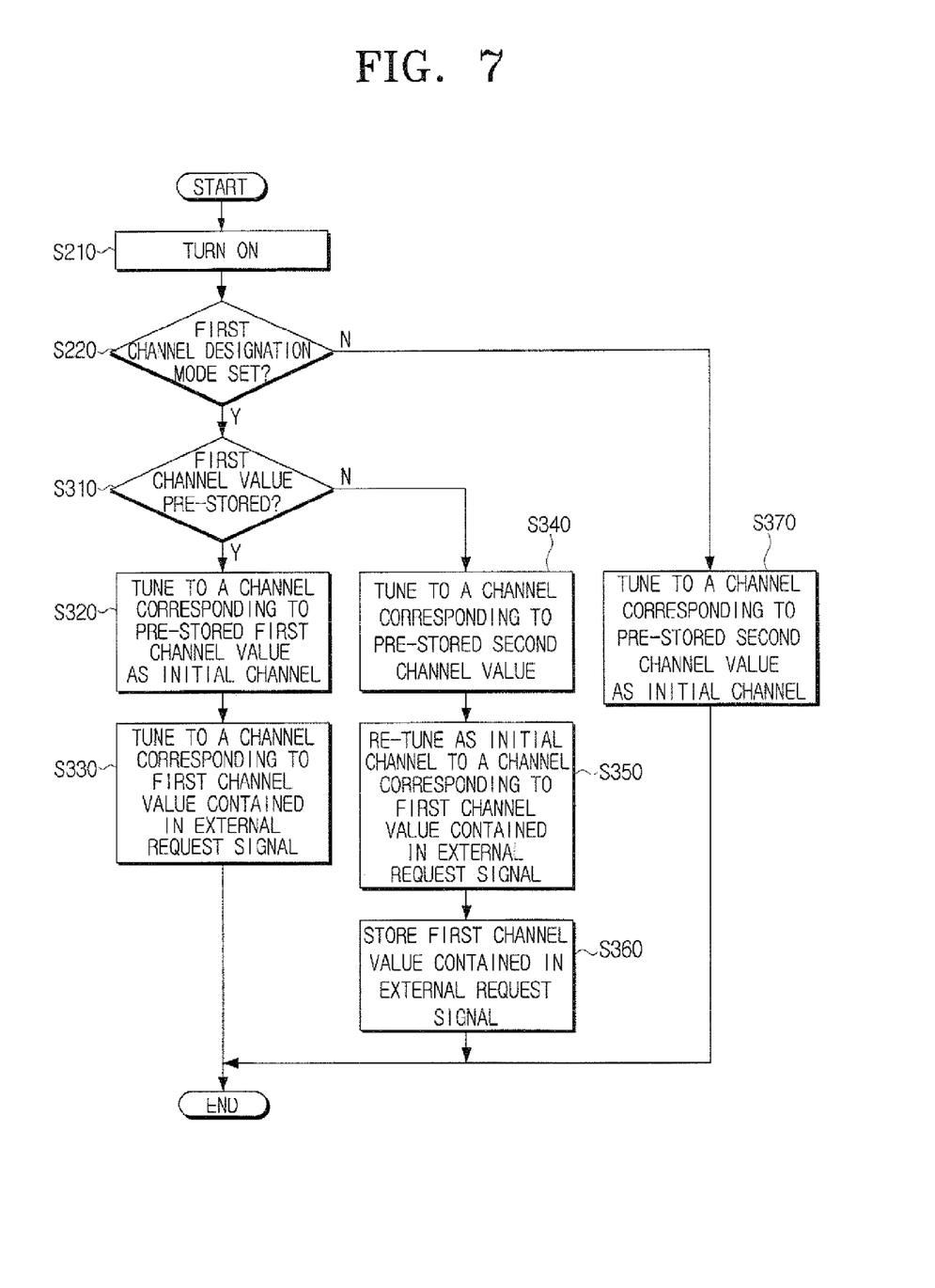

FIG. 5 is a flowchart illustrating a method of driving a display apparatus according to an exemplary embodiment of the present invention, FIG. 6 is another flowchart illustrating a method of driving a display apparatus according to an exemplary embodiment of the present invention, and FIG. 7 is yet another flowchart illustrating a method of driving a display apparatus according to an exemplary embodiment of the present invention.

Referring to FIGS. 5 to 7, a method of driving a display apparatus according to an exemplary embodiment of the present invention includes setting a channel designation mode (S100), determining the set channel designation mode (200), and automatically tuning to an initial channel according to the designation in the set channel designation mode.

The setting (S100) may include displaying channel setting menus (S110), determining whether or not a first channel designation mode is selected (S120), upon determination that the first channel designation mode is selected, setting to the first channel designation mode (S130), and upon determination that the first channel designation mode is not selected, setting to the second channel designation mode (S140).

More specifically, if a request for the setting of channel designation mode is input by a user, for example, if the request is input through a remote controller during the operation of the display apparatus 100, the control unit 100 controls such that the setting menus are displayed on the user interface unit 130.

At S120, the control unit 110 determines which of the channel designation modes of the setting menus is selected by the user. For example, as mentioned above, the channel designation mode may include a first channel designation mode in which the initial channel of the display apparatus 100 is set in accordance with a channel designation request signal (external request signal) being provided by a service provider, and a second channel designation mode in which a previously stored channel such as the last-viewed channel, which was stored before the display apparatus 100 was turned off, is set to be the initial channel of the display apparatus 100. Accordingly, the example in which whether or not the first channel designation mode is selected at S120 will be explained below.

Of course, an alternative example is also possible, in which whether or not the second channel designation mode is selected at S120. Furthermore, more than two channel designation modes may be employed, in which case whether or not a specific channel designation mode is selected may be directly determined.

If the user selects the first channel designation mode, operation S130 is performed, in which the control unit 140 provides the storage unit 120 with the first mode selection information, such that the channel setting storage unit 122 stores the first mode selection information, and the control unit 140 subsequently causes the display apparatus 100 to operate in the first channel designation mode upon turning on.

If the user selects the second channel designation mode, operation S140 is performed, in which the control unit 140 provides the storage unit 120 with the second mode selection information, such that the second mode selection information is stored in the channel setting storage unit, and the control unit subsequently causes the display apparatus 100 to operate in the second channel designation mode upon turning on.

Referring to FIG. 4, the channel value storage unit 124 may store a channel value of the last-viewed channel when the display apparatus 100 is turned off.

Operation S200 may include supplying power to the display apparatus 100 (S210), and determining whether or not the display apparatus 100 is set to the first channel designation mode (S210).

More specifically, if a user manipulates a power-on switch of the display apparatus 100 at S210, power is supplied to the display apparatus 100 to drive the display apparatus 100 and start tuning to an initial channel.

At S220, the control unit 140 determines whether operation S130 (FIG. 5) was performed before the power off so that the first channel designation mode is set. Although the first and the second channel designation modes are provided by the setting menus such that whether one of the first and the second channel designation modes is selected or not is determined in the example explained above, one will understand that determination of the set channel designation mode may be performed according to a variety of different examples.

Operation S300 includes determining whether or not the first channel value is prestored (S310), tuning to the channel corresponding to the first channel value as an initial channel (S320), and tuning to the channel corresponding to the first channel value which is contained in the external request signal (S330).

Operation S300 may further include tuning to the channel corresponding to the prestored second channel value (S340), re-tuning to the channel corresponding to the first channel value contained in the external request signal (S350), and storing the first channel value contained in the external request signal (S360).

Operation S300 further includes tuning to the channel corresponding to the prestored second channel value (S370).

That is, if determination at S220 indicates that the first channel designation mode is set, the control unit 140 determines whether or not the first channel value is stored (S310).

For example, if the channel designation mode before the turning off is the second channel designation mode, because the first channel value is not stored in the storage unit 120 and only the second channel value corresponding to the second channel designation mode is stored in the storage unit 120, determination has to be made whether or not the first channel value is stored.

If determination at S310 indicates that the channel designation mode was the first channel designation mode before the turning off, the control unit 140 at S320 controls the tuning unit 110 to tune to the channel corresponding to the prestored first channel of the storage unit 120. That is, if the first channel value is previously stored, the display apparatus 100 may automatically tune to the channel upon turning on, as intended by the service provider 200.

At S330, the service provider 200 controls the display apparatus 100 to tune to the channel corresponding to the first channel value contained in the external request signal, but the control unit 140 controls such that the tuner unit 110 does not conduct re-tuning, because the prestored channel value (initial channel) matches with the channel value contained in the external request signal (power-on channel).

If determination at S310 indicates that the result of executing operation S130 (FIG. 5) includes the setting of the first channel designation mode, but not the storing of the first channel value, operation S340 is performed.

For example, the first channel value may not be stored, if the display apparatus 100 was in the second channel designation mode before turning off, and later changed to the first channel designation mode by operations S120 and 130.

At S340, the control unit 140 tunes to a channel corresponding to the prestored second channel value. With reference to FIG. 4, the second channel value may include the channel values about the last-viewed channels which were stored each time the display apparatus 100 was turned off.

At S350, the control unit 140 controls the tuner unit 110 to re-tune to the power-on channel which is contained in the external request signal and which corresponds to the first channel value. Accordingly, the tuner unit 110 re-tunes to the power-on channel.

At S340 and S350, because the first channel value is not stored in the storage unit 120, that is, not stored in the channel value storage unit 124, the power-on channel is set to be an initial channel, through the re-tuning generally known in the related art.

At S360, that is, after the re-tuning to the power-on channel at S350, the control unit 140 controls such that the first channel value is extracted from the external request signal and stored in the channel value storage unit 124. Because the display apparatus 100 successively executes S220 to S330 after S360 and turning off, the power-on channel is automatically tuned based on the first channel value, and as a result, double-tuning can be prevented.

If determination at S220 indicates that the first channel designation mode is not set, that is, if the second channel designation mode is set through S120 and S140 (FIG. 5) in one example of the present invention, operation S370 is performed.

At S370, the control unit 140 controls such that the last-viewed channel before turning off is automatically tuned based on the second channel value about the last-viewed channel which is stored each time the display apparatus 100 is turned off. Even after S370, if the external request signal is received from the service provider 200 as in operations S330 and S350, the control unit 140 controls such that the display apparatus is driven in the second channel designation mode being selected by the user through the user interface unit 130 and that the last-viewed channel before the turning off is automatically tuned, ignoring the external request signal.

The examples explained above generally employed a display apparatus 100 which is controllable by the service provider according to the OCAP specification. However, another examples may also incorporate the inventive concept of the present invention explained in the examples set forth above, to enable a service provider to control a display apparatus 100 to tune to a channel selected by a user. For example, the inventive concept of the present invention may be incorporated into the data broadcast specifications such as Advanced Common Application Platform (ACAP) or Multimedia Home Platform (MHP).

According to the exemplary embodiments of the present invention, a display apparatus may tune to a channel according to the selection by a user, between the last-viewed channel before the display apparatus is turned off and a channel intended by a service provider.

Additionally, even if the service provider sets an initial channel, double-tuning of the channel can be avoided and the system overload during booting, can be prevented.

Because time for tuning can be shortened by preventing double-tuning, the system booting time can also be reduced.

While the invention has been shown and described with reference to certain exemplary embodiments thereof, it will be understood by those skilled in the art that various changes in form and details may be made therein without departing from the spirit and scope of the invention as defined by the appended claims and their legal equivalents.

What is claimed is:

1. A display apparatus, comprising:
a channel setting storage unit which stores mode selection information about first and second channel designation modes each of which designates a way of setting an initial channel to be automatically tuned to upon turning on the display apparatus, wherein in the first channel designation mode, a channel designated by an external request signal is tuned to, and in the second channel designation mode, a channel most recently displayed by the display apparatus when the display apparatus was tuned off is initially tuned to;
a channel value storage unit which stores first and second channel values corresponding to the channels to be tuned to in the first and second designation modes respectively; and
a control unit which determines one of the channel designation modes based on the stored mode selection information upon turning on the display apparatus, and controls the display apparatus to automatically tune to a channel, designated to be the initial channel by the determined channel designation mode, wherein the control unit determines whether or not the first channel value is stored in the channel value storage unit if the mode selection information indicates a first channel designation mode, and controls the display apparatus to tune to the second channel if first channel value is not stored.

2. The display apparatus of claim 1, further comprising a user interface unit which displays a setting menu for a selection of one of the channel designation modes, and wherein, if a channel designation mode is selected through the setting menu, the control unit stores the mode selection information of the selected channel designation mode in the channel setting storage unit.

3. The display apparatus of claim 1, wherein the second channel value is set and stored in advance by a user.

4. The display apparatus of claim 1, wherein the control unit comprises a tuning request processing unit which causes the display apparatus to automatically tune to a channel according to the first channel value as an initial channel, if the mode selection information indicates the first channel designation mode.

5. The display apparatus of claim 1, wherein the control unit comprises a tuning request processing unit which causes the display apparatus to automatically tune to a channel according to the first channel value as an initial channel, according to the Open Cable Application Platform (OCAP) specification, if the mode selection information indicates the first channel designation mode.

6. The display apparatus of claim 1, wherein the control unit causes the display apparatus to automatically tune to a channel according to the second channel value as an initial channel, if the mode selection information indicates the second channel designation mode.

7. The display apparatus of claim 1, wherein the control unit
determines whether or not the first channel value is stored in the channel value storage unit, if the mode selection information indicates a first channel designation mode according to which the initial channel is designated according to a first channel value contained in an external request signal, and
stores the first channel value is in the channel value storage unit if the first channel value is not stored.

8. The display apparatus of claim 1, further comprising a tuner unit which tunes to a channel designated to be the initial channel according to the channel designation mode indicated by the mode selection information.

9. A method of driving a display apparatus, comprising:
setting one of first and second channel designation modes which each designate a way of designating an initial channel to be automatically tuned to upon turning on the display apparatus wherein in the first channel designation mode, a channel designated by an external request signal is tuned to, and in the second channel designation mode, a channel most recently displayed by the display apparatus when the display apparatus was tuned off is initially tuned to;
storing first and second channel values corresponding to the channels to be tuned to in the first and second designation modes respectively;
upon turning on the display apparatus, determining the set channel designation mode; and
automatically tuning to a channel as an initial channel, which is designated to be the initial channel in the set channel designation mode,
wherein the automatically tuning comprising:
determining whether or not the first channel value is stored in the channel value storage unit if the first designation mode is set and controlling the display apparatus to tune to the second channel if first channel value is not stored.

10. The method of claim 9, wherein the setting of the channel designation mode comprises selecting one of the first and second channel designation modes, storing mode selection information corresponding to the selected channel designation mode, and setting the selected channel designation mode according to the stored mode selection information.

11. The method of claim 9, wherein the second channel value is set and stored in advance by a user such that the corresponding channel is tuned to upon turning on the display apparatus.

12. The method of claim 9, wherein the automatically tuning comprises automatically tuning to a channel according to the second channel value as an initial channel, irrespective of whether or not the external request signal is input, if the determining indicates that the second channel designation mode is set.

13. The method of claim 9, wherein the automatically tuning comprises:
tuning to a channel according to the second channel value, if the determining indicates that the first channel value is not stored;
tuning to a channel according to the first channel value contained in the external request signal and storing the first channel value; and
automatically tuning to the channel according to the first channel value as an initial channel, upon turning on.

14. The method of claim 12, wherein the automatically tuning comprises automatically tuning to the channel according to the first channel value as an initial channel, if the first channel value is determined to be stored.

15. The method of claim 12, wherein the automatically tuning comprises tuning to the channel according to the first channel value as an initial channel, if the channel designation mode is the first channel designation mode, according to the Open Cable Application Platform specification.

* * * * *